United States Patent
Wu et al.

(10) Patent No.: US 10,963,613 B1
(45) Date of Patent: Mar. 30, 2021

(54) PARTIAL RECONFIGURATION OF INTEGRATED CIRCUITS USING SHELL REPRESENTATION OF PLATFORM DESIGN WITH EXTENDED ROUTING REGION

(71) Applicant: Xilinx, Inc., San Jose, CA (US)

(72) Inventors: Meiwei Wu, San Jose, CA (US); Jun Liu, San Jose, CA (US); Raymond Kong, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/523,973

(22) Filed: Jul. 26, 2019

(51) Int. Cl.
  *G06F 17/50* (2006.01)
  *G06F 30/34* (2020.01)
  *G06F 30/392* (2020.01)

(52) U.S. Cl.
  CPC ............ *G06F 30/34* (2020.01); *G06F 30/392* (2020.01)

(58) Field of Classification Search
  CPC .... G06F 30/34; G06F 30/392; G06F 2219/00; G06F 2119/12
  See application file for complete search history.

(56) References Cited

U.S. PATENT DOCUMENTS

| | | | | |
|---|---|---|---|---|
| 7,308,666 B1 * | 12/2007 | Li | ........................ | G06F 30/392 716/113 |
| 9,026,978 B1 * | 5/2015 | Liu | ....................... | G06F 30/327 716/134 |
| 9,864,830 B1 * | 1/2018 | Jha | ........................ | G06F 30/394 |
| 10,796,058 B1 * | 10/2020 | Mezei | .................... | G06F 30/392 |
| 10,824,786 B1 * | 11/2020 | Liu | ........................ | G06F 30/327 |
| 2005/0024158 A1 | 2/2005 | Andrasic et al. | | |
| 2006/0164139 A1 | 7/2006 | Chong et al. | | |
| 2007/0018733 A1 | 1/2007 | Wang et al. | | |
| 2008/0309393 A1 | 12/2008 | Sun et al. | | |
| 2017/0068765 A1 | 3/2017 | Sinnadurai et al. | | |

OTHER PUBLICATIONS

U.S. Appl. No. 16/141,723, filed Sep. 25, 2018 San Jose, CA USA.
U.S. Appl. No. 16/518,365, filed Jul. 22, 2019 San Jose, CA USA.

\* cited by examiner

*Primary Examiner* — Nghia M Doan
(74) *Attorney, Agent, or Firm* — Kevin T. Cuenot

(57) ABSTRACT

Partial reconfiguration of a programmable integrated circuit can include loading, using computer hardware, a platform design including a module black-box instance corresponding to a user design and marking, using the computer hardware, data of the platform design including data relating to synchronous boundary crossings between the platform design and the module black-box instance and implementation data for the platform design within an extended routing region available for routing the user design. Unmarked data can be removed from the platform design resulting in a shell circuit design. The user design can be implemented based on the shell circuit design and timing constraints corresponding to the marked data in the shell circuit design.

20 Claims, 7 Drawing Sheets

PARTIAL RECONFIGURATION OF INTEGRATED CIRCUITS USING SHELL REPRESENTATION OF PLATFORM DESIGN WITH EXTENDED ROUTING REGION

TECHNICAL FIELD

This disclosure relates to integrated circuits (ICs) and, more particularly, to implementing circuit designs in an IC using partial reconfiguration and a shell representation of a platform design.

BACKGROUND

A programmable integrated circuit (IC) refers to a type of device that includes programmable circuitry. An example of a programmable IC is a field programmable gate array (FPGA). An FPGA is characterized by the inclusion of programmable circuit blocks. Examples of programmable circuit blocks include, but are not limited to, input/output blocks (IOBs), configurable logic blocks (CLBs), dedicated random access memory blocks (BRAM), digital signal processing blocks (DSPs), processors, clock managers, and delay lock loops (DLLs).

Typically, each programmable circuit block includes programmable interconnects and programmable logic (referred to collectively as "programmable circuitry"). Programmable interconnects typically include a large number of interconnect lines of varying lengths interconnected by programmable interconnect points (PIPs). Programmable logic implements the logic of a user design using programmable elements that may include, for example, function generators, registers, arithmetic logic, and so forth.

The programmable circuitry may be programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs may be partially reconfigured. Partial reconfiguration refers to a capability in which a region of programmable circuitry of the device is reconfigured by loading different configuration data therein to implement different circuitry in the region than was previously implemented. The region is a portion of the available programmable circuitry on the device. Other portions of programmable circuitry of the device not included in the region may implement circuitry that is capable of operating uninterrupted by reconfiguration of the region. Partial reconfiguration allows the programmable IC to implement different circuit designs in a designated region over time while other neighboring and/or surrounding programmable circuitry of the device continues to operate without interruption.

SUMMARY

In one aspect, a method can include loading, using computer hardware, a platform design including a module black-box instance corresponding to a user design. The method can include marking, using the computer hardware, data of the platform design including data relating to synchronous boundary crossings between the platform design and the module black-box instance and implementation data for the platform design within an extended routing region available for routing the user design. The method can also include removing, using the computer hardware, unmarked data from the platform design resulting in a shell circuit design. The method further can include implementing, using the computer hardware, the user design based on the shell circuit design and timing constraints corresponding to marked data in the shell circuit design.

Another aspect includes a system having a processor configured to initiate operations. The operations can include loading a platform design including a module black-box instance corresponding to a user design. The operations can include marking data of the platform design including data relating to synchronous boundary crossings between the platform design and the module black-box instance and implementation data for the platform design within an extended routing region available for routing the user design. The operations can also include removing unmarked data from the platform design resulting in a shell circuit design. The operations further can include implementing the user design based on the shell circuit design and timing constraints corresponding to marked data in the shell circuit design.

Another aspect includes a computer program product including a computer readable storage medium having program code stored thereon. The program code is executable by computer hardware to initiate operations. The operations can include loading a platform design including a module black-box instance corresponding to a user design. The operations can include marking data of the platform design including data relating to synchronous boundary crossings between the platform design and the module black-box instance and implementation data for the platform design within an extended routing region available for routing the user design. The operations can also include removing unmarked data from the platform design resulting in a shell circuit design. The operations further can include implementing the user design based on the shell circuit design and timing constraints corresponding to marked data in the shell circuit design.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
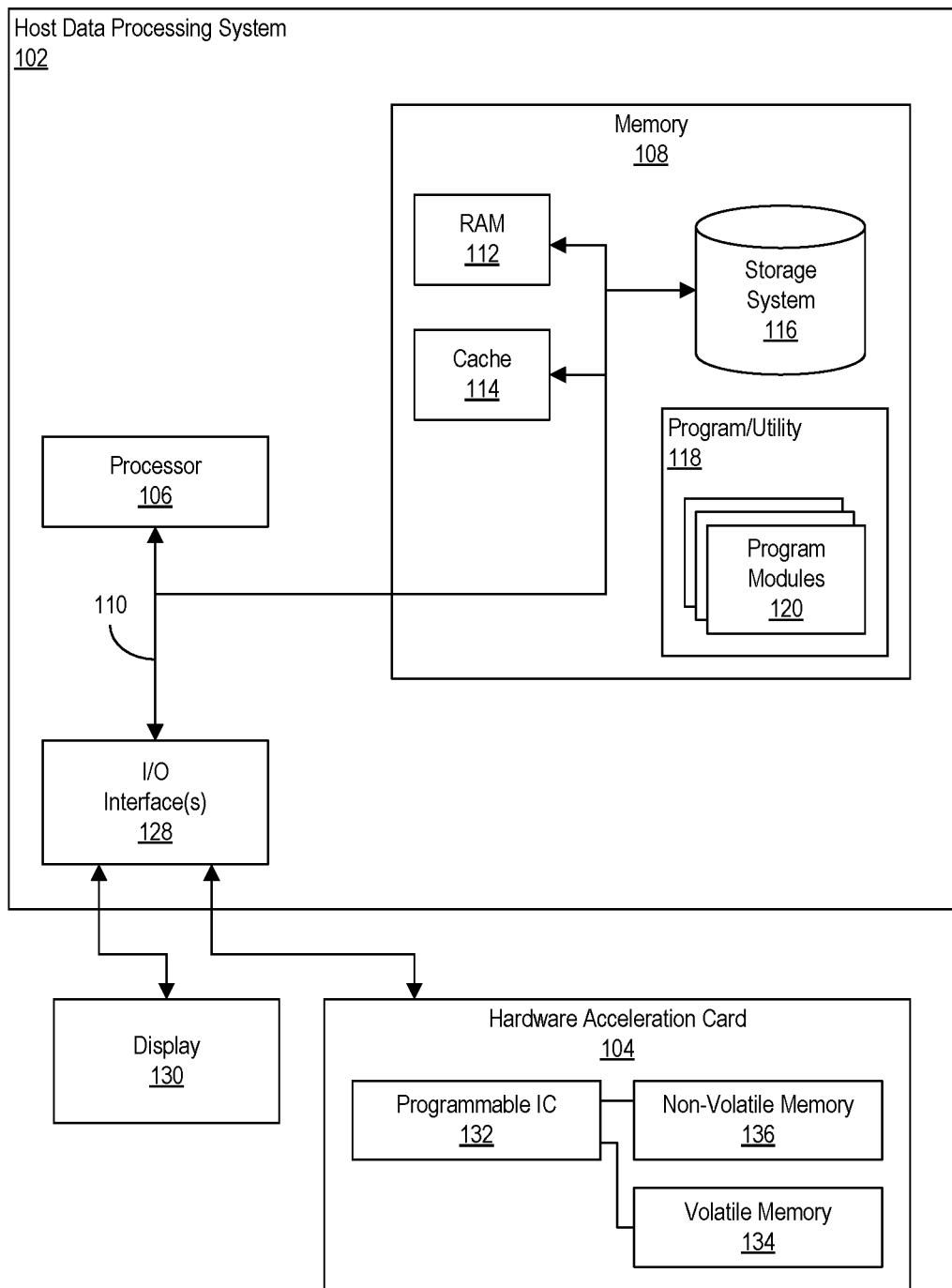
FIG. 1 illustrates an example computing environment for use with one or more embodiments described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to implementing circuit designs in an IC using partial reconfiguration and a shell representation of a platform design. A user design is implemented within an IC in combination with a platform design. The user design is a user-specified circuit design that is to be implemented within the IC using partial reconfiguration. The user design may be a custom circuit design. The user design is implemented within a partial reconfiguration (PR) region of the IC often referred to as a "user PR region." A PR region of an IC refers to a region of programmable circuitry that is reserved for implementing one or more different circuit designs dynamically over time. An IC can include more than one PR region. A user PR region is a PR region reserved for implementing user designs.

The platform design is implemented in another region of programmable circuitry of the IC referred to as the "platform region." The platform region is distinct from the user PR region(s). The platform region is formed in whole or in part by a region of programmable circuitry referred to as a "static region." A "static region" of programmable circuitry refers to programmable circuitry of the IC that implements a circuit design that does not change, e.g., remains static, while circuitry in the PR region(s) may change to implement other, different circuit designs over time. Circuitry in the static region may continue to operate uninterrupted while PR regions are reconfigured dynamically.

In implementing a user design, electronic design automation (EDA) tools must connect the user design to the platform design. The user design must undergo synthesis, placement, and routing, for example, to ensure that the user design correctly connects to the platform design in the IC. This process is time consuming, often taking many hours and significant computational resources to complete.

In accordance with the inventive arrangements described herein, the platform design is processed to generate a shell circuit design. The shell circuit design is a representation of the platform design that is smaller in size (e.g., requiring less memory) than the platform design itself. Still, the shell circuit design includes sufficient design detail of the platform design so as to allow the EDA tools to implement the user design. The shell circuit design is created by the EDA tools by selectively removing portions of the platform design. By using the shell circuit design instead of the platform design, the EDA tools are capable of implementing the user design in less time and with fewer computational resources than is the case with other techniques (e.g., where the full platform design is used).

In addition, the shell circuit design, being an alternative or abstracted representation of the platform design, allows a platform design provider to explicitly hide the netlist and/or other design information for the platform design from other parties including the creator of the user design. A party with malicious intent, for example, could create a user design for integration with a platform design. If the details of the platform design (e.g., the netlist and/or other design information) were exposed, the party with malicious intent could create a user design tailored to compromise the platform design, the IC in which the user design is to be implemented, and/or another system in which the IC is included. In accordance with the inventive arrangements described herein, the creator of the user design need only access the shell circuit design to create the user design, which improves overall security of the hardware acceleration computing infrastructure.

In some cases, the user design is implemented in the IC in such a way that the platform circuitry extends beyond a boundary of the user PR region of programmable circuitry and into the platform region of programmable circuitry used to implement the platform design. For example, the user design may have signal paths that are routed beyond the user PR region and into the platform using routing resources of the platform region.

In cases as described, selected placement and/or routing information of the platform design may be preserved within the shell circuit design. Preservation of this information allows the EDA tools to generate valid partial configuration bitstreams for the user design. The partial configuration bitstreams include any placement and/or routing information corresponding to the platform, at least for those portions of the platform region that are allowed to be used to implement portions of the user design. Were such information not preserved, implementing the user design in the user PR region would disrupt the platform as implemented within the platform region.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing environment 100 for use with the inventive arrangements described within this disclosure. The computing environment includes a host data processing system (host system) 102 coupled to a hardware acceleration card (card) 104. The components of host system 102 may include, but are not limited to, one or more processors 106 (e.g., central processing units), a memory 108, and a bus 110 that couples various system components including memory 108 to processor(s) 106. Processor(s) 106 may include any of a variety of processors that are capable of executing program code. Example processor types include, but are not limited to, processors having an x86 type of architecture (IA-32, IA-64, etc.), Power Architecture, ARM processors, and the like.

Bus 110 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Host system 102 typically includes a variety of computer readable media. Such media may be any available media that is accessible by host system 102 and may include any combination of volatile media, non-volatile media, removable media, and/or non-removable media.

Memory 108 may include computer readable media in the form of volatile memory, such as random-access memory (RAM) 112 and/or cache memory 114. Host system 102 may also include other removable/non-removable, volatile/non-volatile computer system storage media. By way of example, storage system 116 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. As will be further depicted and described below, memory 108 may include at least one computer program product having a set (e.g., at least one) of program modules (e.g., program code) that are configured to carry out the functions and/or operations described within this disclosure.

For example, program/utility 118, having a set (at least one) of program modules 120 which may include, but are not limited to, an operating system, one or more application programs (e.g., user applications), other program modules, and/or program data, is stored in memory 108. Program modules 120 generally carry out the functions and/or methodologies as described herein at least with respect to operations performed by host system 102.

For example, program modules 120 may implement a software stack. The software stack may implement a runtime environment capable of performing the host system 102 operations described herein in relation to configuring and/or controlling hardware accelerator card 104 and any components and/or ICs thereon. The software stack may include a driver or daemon capable of communicating with programmable IC 132.

In another aspect, program modules 120 include an EDA application. The EDA application, when executed by processor 106, is capable of performing the various operations described herein relating to generation of a shell circuit design from a platform design and implementing a user design using the shell circuit design. The platform design and the user design may be specified in any of a variety of different formats including, but not limited to, hardware description language (HDL), netlist, EDIF, an internal binary format, or other suitable form. Timing constraints can be specified in an XDC format or another suitable timing constraint specification format.

In implementing the user design, the EDA application, as executed by host system 102, is capable of performing operations of a design flow (e.g., synthesis, placement, routing, and/or bitstream generation). The implemented user design, e.g., a placed and routed version of the user design, can be loaded or implemented within programmable IC 132, e.g., as a partial configuration bitstream. Programmable IC 132 may have an architecture as described herein in connection with FIGS. 2, 3, 4, and/or 8.

Program/utility 118 is executable by processor(s) 106. Program/utility 118 and any data items used, generated, and/or operated upon by processor(s) 106 are functional data structures that impart functionality when employed by processor(s) 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host system 102 may include one or more Input/Output (I/O) interfaces 128 communicatively linked to bus 110. I/O interface(s) 128 allow host system 102 to communicate with external devices, couple to external devices that allow user(s) to interact with host system 102, couple to external devices that allow host system 102 to communicate with other computing devices, and the like. For example, host system 102 may be communicatively linked to a display 130 and to hardware acceleration card 104 through I/O interface(s) 128. Host system 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which host system 102 communicates with hardware acceleration card 104 is a PCIe adapter. Hardware acceleration card 104 may be implemented as a circuit board that couples to host system 102. Hardware acceleration card 104 may, for example, be inserted into a card slot, e.g., an available bus and/or PCIe slot, of host system 102.

Hardware acceleration card 104 includes a programmable IC 132. Hardware acceleration card 104 also includes volatile memory 134 coupled to programmable IC 132 and a non-volatile memory 136 also coupled to programmable IC 132. Volatile memory 134 may be implemented as a RAM that is external to programmable IC 132, but is still considered a "local memory" of programmable IC 132, whereas memory 108, being within host system 102, is not considered local to programmable IC 132. In some implementations, volatile memory 134 may include multiple gigabytes of RAM, e.g., 64 GB of RAM. Non-volatile memory 136 may be implemented as flash memory. Non-volatile memory 136 is also external to programmable IC 132 and may be considered local to programmable IC 132.

FIG. 1 is not intended to suggest any limitation as to the scope of use or functionality of the examples described herein. Host system 102 is an example of computer hardware (e.g., a system) that is capable of performing the various operations described within this disclosure relating to hardware acceleration card 104 and/or programmable IC 132.

Host system 102 is only one example implementation of a computer that may be used with a hardware acceleration card. Host system 102 is shown in the form of a computing device, e.g., a computer or server. Host system 102 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments and/or edge computing environments using host system 102 or other suitable data processing system, generally support the FPGA-as-a-Service (FaaS) model. In the FaaS model, user functions are hardware accelerated as circuit designs implemented within programmable ICs operating under control of the (host) data processing systems. Multiple different users may share access to a single FPGA or a pool of FPGAs coupled to host system 102 over time. The shell circuit designs described herein may be used in the context of FaaS and/or other computing environments. Other examples of cloud computing models are described in the National Institute of Standards and Technology (NIST) and, more particularly, the Information Technology Laboratory of NIST.

Host system 102 is operational with numerous other general-purpose or special-purpose computing system environments or configurations. Examples of computing systems, environments, and/or configurations that may be suitable for use with host system 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The inventive arrangements described within this disclosure are capable of providing improved operation of host system 102. Host system 102, for example, is capable of performing the operations necessary to create and implement a user design, e.g., perform synthesis, placement, routing, bitstream generation, and/or loading of the configuration bitstream in programmable IC 132, in less time and using fewer computational resources (memory, processor time, etc.) than would otherwise be the case had shell circuit design(s) not been created and used as described herein. Thus, the inventive arrangements support faster execution and operation of host system 102 while performing various stages of a design flow and/or hardware accelerating user designs.

Figure 2:
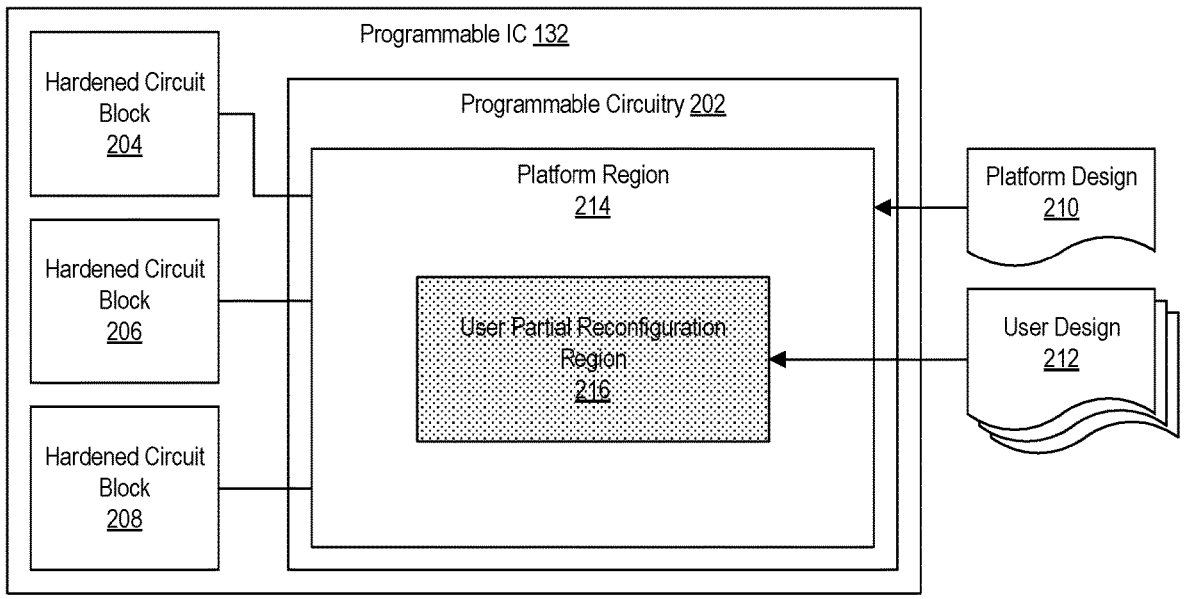
FIG. 2 illustrates an example layout showing different regions of a programmable integrated circuit (IC).

FIG. 2 illustrates an example layout showing different regions of programmable IC 132. In the example of FIG. 2, programmable IC 132 includes programmable circuitry 202. Programmable circuitry 202 is capable of implementing any of a variety of circuit designs including platform design 210 and user design 212. In the example of FIG. 2, programmable IC 132 includes hardened circuit blocks 204, 206, and 208. Hardened circuit blocks 204-208 represent circuitry such as processor(s) capable of executing program code, transceiver(s), direct memory access (DMA) circuit(s), memory controller(s), and/or one or more communication interfaces such as PCIe endpoints, USB ports, and the like. The particular number of hardened circuit blocks shown in FIG. 2 is for purposes of illustration and not limitation. In other examples, programmable IC 132 does not include hardened circuit blocks. Still, programmable IC 132 may include more hardened circuit blocks or fewer hardened circuit blocks than shown in FIG. 2.

In the example of FIG. 2, platform design 210 is implemented within platform region 214 of programmable circuitry 202. In one aspect, platform region 214 is formed entirely of static circuitry. In that case, platform region 214, which does not include user PR region 216 (e.g., is the unshaded block surrounding user PR region 216), may be referred to as a static region of programmable circuitry 202. As defined herein, static circuitry is programmable circuitry that is configured to implement a portion of platform design 210 or the entirety of platform design 210 and does not change over time. In another aspect, platform region 214 is formed of a static region having static circuitry and one or more PR regions. In either case, platform region 214, once configured to implement platform design 210, is capable of operating uninterrupted while user PR region 216 is dynamically reconfigured over time to implement different ones of user design 212.

Platform design 210, as implemented in platform region 214, provides infrastructure circuitry that supports operation of implemented user design(s) 212. User design 212 is implemented within PR region 216 of programmable circuitry 202. A boundary of user PR region 216 contacts or abuts a boundary of platform region 214. User PR region 216 may be reserved for, and used to implement different ones of, user designs 212 over time. As different user designs 212 are implemented in user PR region 216, the platform circuitry specified by platform design 210 implemented in platform region 214 continues to operate uninterrupted.

In one or more embodiments, platform design 210 connects user design 212 to hardened circuit blocks 204-208 thereby allowing user design 212 to communicate with circuits and/or systems external to programmable IC 132 (e.g., to host system 102, volatile memory 134, and/or non-volatile memory 136). In one or more other embodiments, platform design 210 implements "soft" versions of one or more of the hardened circuit blocks 204-208 thereby enabling user design 212 to communicate with circuits and/or systems external to programmable IC 132 without hardened circuit blocks 204-208. As noted, hardened circuit blocks 204-208 may be omitted from programmable IC 132.

As an illustrative and nonlimiting example, host system 102 is capable of communicating with implemented user design 212 through hardened circuit blocks 204-208 and/or implemented platform design 210. Host system 102 is capable of offloading tasks to programmable IC 132 and, more particularly, to user design 212 as implemented in user PR region 216 for processing.

Host system is capable of offloading tasks to implemented user design 212 by storing data within volatile memory 134 on card 104. In one aspect, host system 102 sends the data to a bus endpoint implemented in platform design 210 and/or implemented as one of hardened circuit blocks 204-208. A DMA may also be included in platform design 210 and/or implemented as one of hardened circuit blocks 204-208 to facilitate data transfer through the bus endpoint. The data is then passed to a memory controller of platform design 210 and/or implemented as one of hardened circuit blocks 204-208. User design 212 is capable of accessing the data from volatile memory 134, processing the data, and writing results to volatile memory 134 through the memory controller. Host system 102 may retrieve the results generated by user design 212 from volatile memory 134 using the bus endpoint, the DMA, and the memory controller.

In particular embodiments, platform design 210 is specified as a configuration bitstream or a partial configuration bitstream that is loaded into programmable IC 132 to implement platform design 210 as physical circuitry within platform region 214 of programmable circuitry 202. User design 212 may be specified as a partial configuration bitstream that is loaded into programmable IC 132 to implement user design 212 as physical circuitry within user PR region 216 of programmable circuitry 202. Different ones of user designs 212 may be implemented as described herein, and then loaded into programmable IC 132 within user PR region 216 over time. Platform design 210, when implemented in programmable circuitry 202, and hardened circuit blocks 204-208 are capable of continuing to operate and communicate with one or more external systems (e.g., volatile memory 134, non-volatile memory 136, and/or host system 102) while user PR region 216 undergoes partial reconfiguration to implement a different user design 212. Each of the user designs 212, once implemented, is capable of interacting with circuits and/or systems external to programmable IC 132 by way of hardened circuit blocks 204-208 and/or implemented platform design 210.

Figure 3:
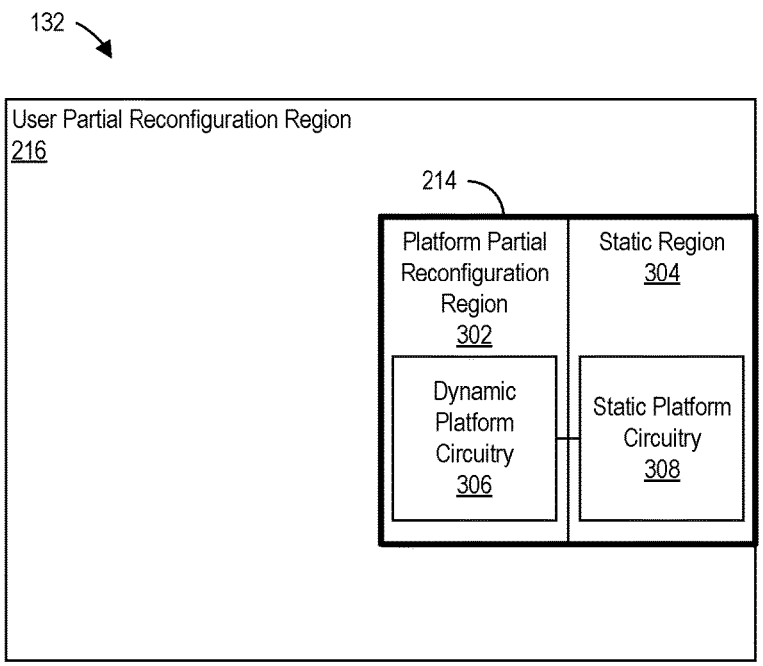
FIG. 3 illustrates another example layout showing different regions of a programmable IC.

FIG. 3 illustrates another example layout showing different regions of programmable IC 132. In the example of FIG. 3, programmable IC 132 does not include hardened circuit blocks 204-208. The platform circuitry specified by platform design 210 (e.g., the implemented version of platform design 210) is implemented in platform region 214. In the example of FIG. 3, platform region 214 includes a static region 304 and a platform PR region 302. Platform PR region 302 implements dynamic platform circuitry 306 while static region 304 implements static platform circuitry 308. As discussed, the platform circuitry facilitates communication between host system 102 and programmable IC 132 including any user circuitry (e.g., implemented versions of user designs 212) implemented therein.

In the example of FIG. 3, once platform design 210 is loaded into programmable IC 132, the platform circuitry provides host system interfaces and optionally memory interfaces for the duration of operation. The platform circuitry may be implemented in programmable IC 132 by loading one or more configuration bitstreams therein.

In one aspect, the platform circuitry is implemented by loading a first partial configuration bitstream to implement static platform circuitry 308 in static region 304 and a second partial configuration bitstream to implement dynamic platform circuitry 306 in platform PR region 302. In one aspect, static platform circuitry 308 may be provided by the manufacturer or provider of programmable IC 132. In another aspect, static platform circuitry 308 may be provided by a data center vendor. In one aspect, static platform circuitry 308 is capable of establishing a communication link between programmable IC 132 and host system 102. While static region 304 may be reconfigured (e.g., since the entirety of programmable IC 132 may be initialized and restarted), such an operation would take programmable IC 132 offline from host system 102 (e.g., disconnect the communication link established between programmable IC 132 and host system 102).

Platform PR region 302 represents a region of programmable circuitry of programmable IC 132. Platform PR region 302 implements other components of platform circuitry that provide an interface between static region 304, user PR region 216, and optionally other resources such as off-chip memory (e.g., volatile memory 134 and/or non-volatile memory 136) and/or other hardwired circuit blocks that may be included in programmable IC 132. Dynamic platform circuitry 306 may be provided by the data center vendor. Platform PR region 302 may be reconfigured by loading a different partial configuration bitstream in programmable IC 132 without affecting or disrupting operation of static platform circuitry 308 in static region 304. As such, aspects of the platform circuitry, e.g., dynamic platform circuitry 306, may be updated over time dynamically without disconnecting the communication link between programmable IC 132 and host system 102.

User PR region 216 may be dynamically reconfigured over time to implement different user designs 212 (e.g., kernels) therein. The user designs 212 implemented in user PR region 216 are designed to connect to circuit block(s) of platform circuitry and, in the example of FIG. 3, dynamic platform circuitry 306 implemented platform PR region 302.

FIG. 3 is provided for purposes of illustration and not limitation. In other example implementations, the architecture of platform region 214 described in connection with FIG. 3 may be used in cases where programmable IC 132 does include one or more hardened circuit blocks as described in connection with FIG. 2.

Figure 4:
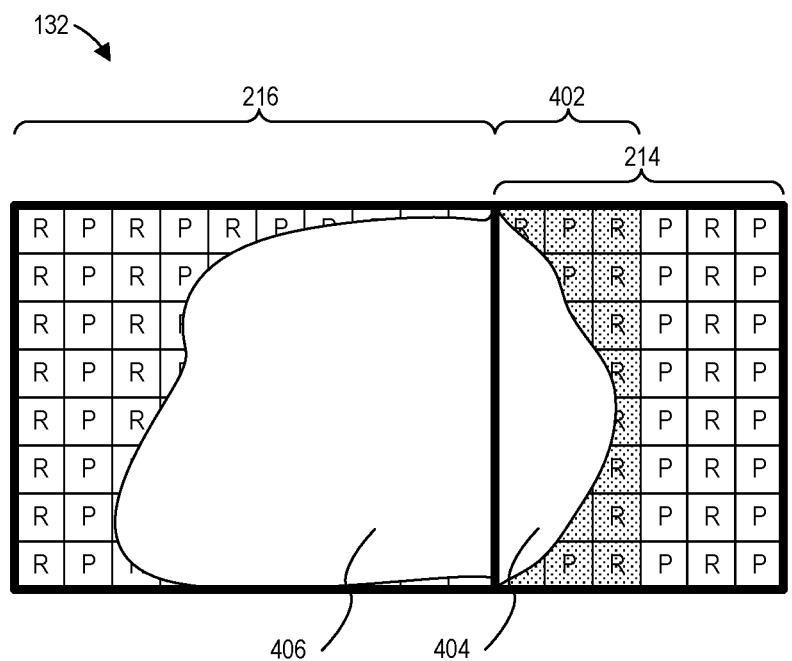
FIG. 4 illustrates another example layout showing different regions of a programmable IC.

FIG. 4 illustrates another example layout showing different regions of a programmable IC 132. In the example of FIG. 4, platform region 214 and user PR region 216 are shown. In one aspect, the architecture of programmable circuitry 202 in programmable IC 132 may include alternating columns of placement blocks labeled "P" and columns of routing blocks labeled "R." In general, placement blocks are blocks of programmable circuitry to which components of a circuit design may be assigned. Examples of placement blocks include, but are not limited to, block RAMs, digital signal processing (DSP) blocks, configurable logic blocks (CLBs), or other logic circuits to which components of a circuit design may be placed. Routing blocks are blocks of programmable circuitry that include interconnect circuitry such as programmable interconnect points and the like that are capable of connecting different ones of the placement blocks together.

In the example of FIG. 4, platform design 210 is implemented in platform region 214. User design 212 is generally implemented in user PR region 216. For purposes of illustration, the shape of platform region 214 and user PR region 216 differ from that illustrated in FIGS. 2 and 3. Platform region 214 includes three columns of placement blocks and three columns of routing blocks. User PR region 216 includes five columns of placement blocks and five columns of routing blocks.

The example of FIG. 4 also illustrates an extended routing region 402. Extended region 402 is shown with shading. For purposes of illustration, extended routing region 402 includes two columns of routing blocks and one column of placement blocks. Extended routing region 402 is a region of programmable circuitry that is at least part of platform region 214. Extended routing region 402 is a region of programmable circuitry 202 into which portions of user design 212 may extend. For example, in some cases, an EDA system (e.g., an implementation tool such as host system 102) may route one or more signals of user design 212 using routing resources in extended routing region 402. Region 406 represents the portion of user PR region 216 used to implement user design 212. Region 404 represents the portion of extended routing region 402 (e.g., and platform region 214) that includes routing resources of user design 212. In the example of FIG. 4, both columns of routing blocks in extended routing region 402 are used to route one or more signals of user design 212. As noted, the routing blocks of extended routing region 402 are also used to route signals of platform design 210, though signals of platform design 210 and signals of user design 212 do not share routing resources (e.g., wires).

In cases where user design 212 is permitted to use routing resources in extended routing region 402, the routing information and/or placement information for the portion of platform design 210 that is implemented in extended routing region 402 must be preserved when generating the shell circuit design. Otherwise, user design 212, when implemented in the programmable IC, may not include the necessary placement and/or routing information corresponding to platform design 210. This can result in incomplete configuration data being written to programmable IC 132 and programmable IC 132 not functioning correctly.

In another aspect, where user design 212 is permitted to use routing resources in extended routing region 402, the routing information for the portion of platform design 210 that is implemented in extended routing region 402 must be preserved when generating the shell circuit design. The placement information for the portion of platform design 210 implemented in extended routing region 402 need not be preserved. In this example, the configuration data for columns of routing blocks may be written to programmable IC 132 independently of configuration data for columns of placement blocks. Without preserving the routing information for platform design 210 within extended region 402, user design 212, when implemented in the programmable IC, may not include the routing information corresponding to platform design 210. This can result in incomplete configuration data being written to programmable IC 132 and programmable IC 132 not functioning correctly.

Figure 5:
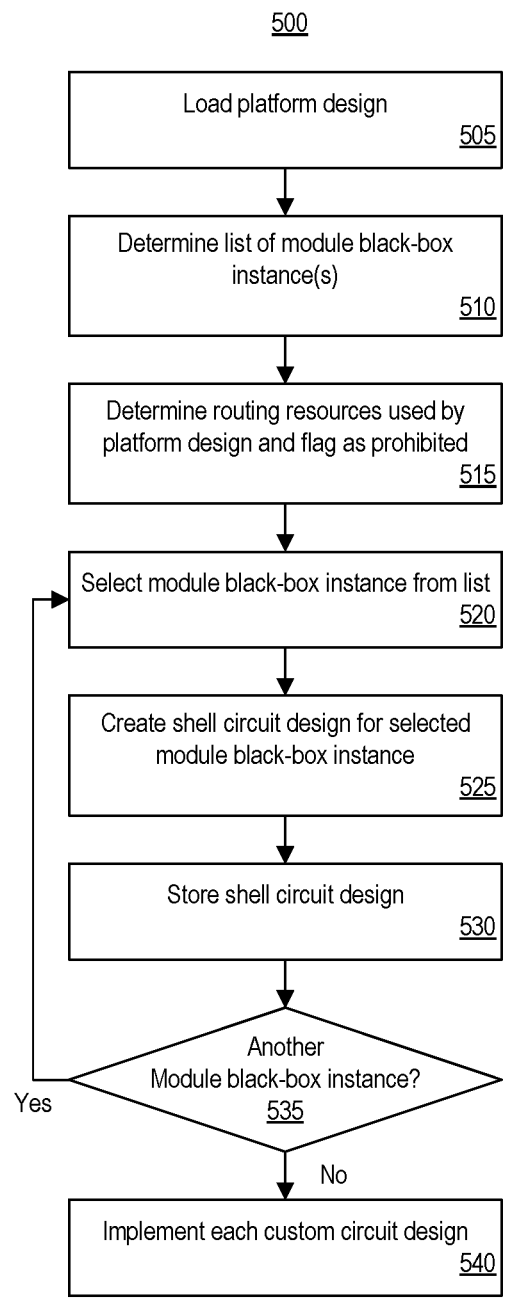
FIG. 5 illustrates an example method of implementing a user design using a shell circuit design.

FIG. 5 illustrates an example method 500 of implementing a user design using a shell circuit design. Method 500 may be performed by a data processing system such as host system 102 described in connection with FIG. 1 or another suitable computer system. In one or more embodiments, the platform design is a fully placed and routed circuit design. Still, the platform design includes one or more modules that are "black-boxed" or empty. These modules are referred to as "module black-box instances."

For purposes of implementation, each user design, e.g., a netlist of the user design, is typically inserted into a module black-box instance of the platform design for implementation within the programmable IC. The platform design may include one or more different module black-box instances, where each module black-box instance is capable of receiving a user design for implementation. A platform design that includes more than one module black-box instance is capable of implementing more than one user design concurrently. In accordance with the inventive arrangements, a shell circuit design is derived from the platform design. The user design may be implemented using the shell circuit design as opposed to the full platform design.

In block 505, the system loads a platform design. For example, in block 505, the system loads the platform design into runtime memory (e.g., RAM 112). The platform design includes one or more "module black-box instances." The platform design is fully placed and routed. In one or more embodiments, each "module black-box instance" is an empty partial reconfiguration (PR) module. An empty PR module is implemented as an empty logical module, e.g., a data structure, specified using hardware description language (HDL) with a "partial reconfiguration" attribute associated therewith.

In one or more embodiments, each of the module black-box instances is an empty PR module that corresponds to a particular user design or plurality of user designs that are intended to be implemented in the module black-box instance. In particular embodiments, each module black-box instance includes or lists the particular pins of the platform design to which the corresponding user design(s) to be implemented therein must connect in order to connect to the platform design. The pins, also referred to as partition pins, define signal crossings between the platform region (e.g., specified as a module of HDL of the platform design) and a PR module (e.g., as implemented in a PR region such as the user PR region) or between two or more PR modules (e.g., as implemented in two or more different PR regions).

Since each user design is created for implementation within a particular module black-box instance of the platform design, in cases where the platform design includes more than one module black-box instance, the particular module black-box instance in which each circuit user design is to be implemented is specified or otherwise annotated for the user design. Such is the case since each module black-box instance will have different pins and pin configurations for connecting to user designs.

In block 510, the system determines a list of each module black-box instance included in the platform design. For example, the system is capable of parsing the platform design to identify each of the module black-box instances included therein. In block 515, the system determines the routing resources used by the platform design. The system flags the routing resources used by the platform design as prohibited for use in implementing any user design. By designating routing resources used by the platform design as prohibited, the system does not utilize such routing resources when implementing, e.g., routing, the user design(s). Marking routing resources used by the platform design as prohibited prevents contention for the routing resources by the user design(s) and possible short-circuits when the platform design and user design(s) are implemented in the target IC. The system does not use prohibited routing resources to route the user design.

In block 520, the system selects a module black-box instance from the list. In block 525, the system creates a shell circuit design for the selected module black-box instance. The system is capable of marking one or more objects, e.g., data, of the platform design considered to be necessary for implementing the user design corresponding to the selected module black-box instance. For example, the system is capable of determining synchronous boundary crossings between the platform region and the module black-box instance of the platform design and marking such objects included in the synchronous boundary crossings. The system removes those objects and/or data that are not marked for preservation from the platform design. The remaining objects and/or data of the platform design are stored as the shell circuit design.

In one or more embodiments, rather than operating on the original or only copy of the platform design, the system may create a copy of the platform design for use in generating each shell circuit design. This preserves the availability of the original platform design for subsequent use and/or purposes.

In block 530, the system stores the shell circuit design. For example, the system is capable of storing the shell circuit design in persistent memory. In one or more embodiments, the shell circuit design is stored as a placed and routed netlist, in an internal binary format, or using EDIF. Further, the system is capable of associating the shell circuit design with one or more of the user design(s) for use in implementing each associated user design. In one or more other embodiments, the system writes the shell circuit design to memory as a Design Checkpoint File. A Design Checkpoint File may be a package file, e.g., a compressed container capable of storing multiple files, that includes the netlist, an internal binary format, and/or an EDIF version of the shell circuit design. The system is also capable of storing timing constraints associated with the shell circuit design. The system can store the associated timing constraints in runtime memory or in persistent memory such as in the Design Checkpoint File (e.g., in a binary format), in a proprietary format, or as text in XDC format.

In block 535, the system determines whether another module black-box instance of the platform design remains to be processed. In response to determining that another module black-box instance remains to be processed, method 500 loops back to block 520 to select a further module black-box instance for processing. In response to determining that no further module black-box instances remain to be processed, method 500 continues to block 540.

In block 540, the system implements each user design. For example, the system is capable of selecting a user design and the corresponding or associated shell circuit design for processing. When implementing a user design, the system need only load the user design and the shell circuit design corresponding to the user design into runtime memory. The entirety of the platform design is not required to be accessed or loaded into runtime memory to implement the user design. Similarly, only those timing constraints for objects that are still included within the shell circuit design need be loaded into runtime memory and used to implement the user design. As such, any timing constraints relating to objects removed from the platform design to create the shell circuit design are not used in implementing the user design. The system is capable of synthesizing, placing, and routing the user design using the corresponding shell circuit design and timing constraints for objects and/or data included in the shell circuit design.

By significantly reducing the amount of data for the platform design and corresponding timing constraints used when implementing the user design, the time required to perform complex tasks such as synthesis, placement, and/or routing is significantly reduced compared to other techniques for implementing the user design where the entire platform design is loaded into memory along with all of the timing constraints for the platform design. The operations described for block 540 may be performed for each user design using the shell circuit design corresponding to that user design.

The system is also capable of generating a partial configuration bitstream specifying the actual circuitry to be implemented within the programmable IC for each of the user designs. The partial configuration bitstreams for different user designs corresponding to the same PR region can be loaded into the programmable IC at different times in order to implement the different user designs within the user PR region of the programmable IC as needed over time. The partial configuration bitstreams for different user designs of different user PR regions can be loaded into the programmable IC concurrently and/or at different times as may be required.

Figure 6:
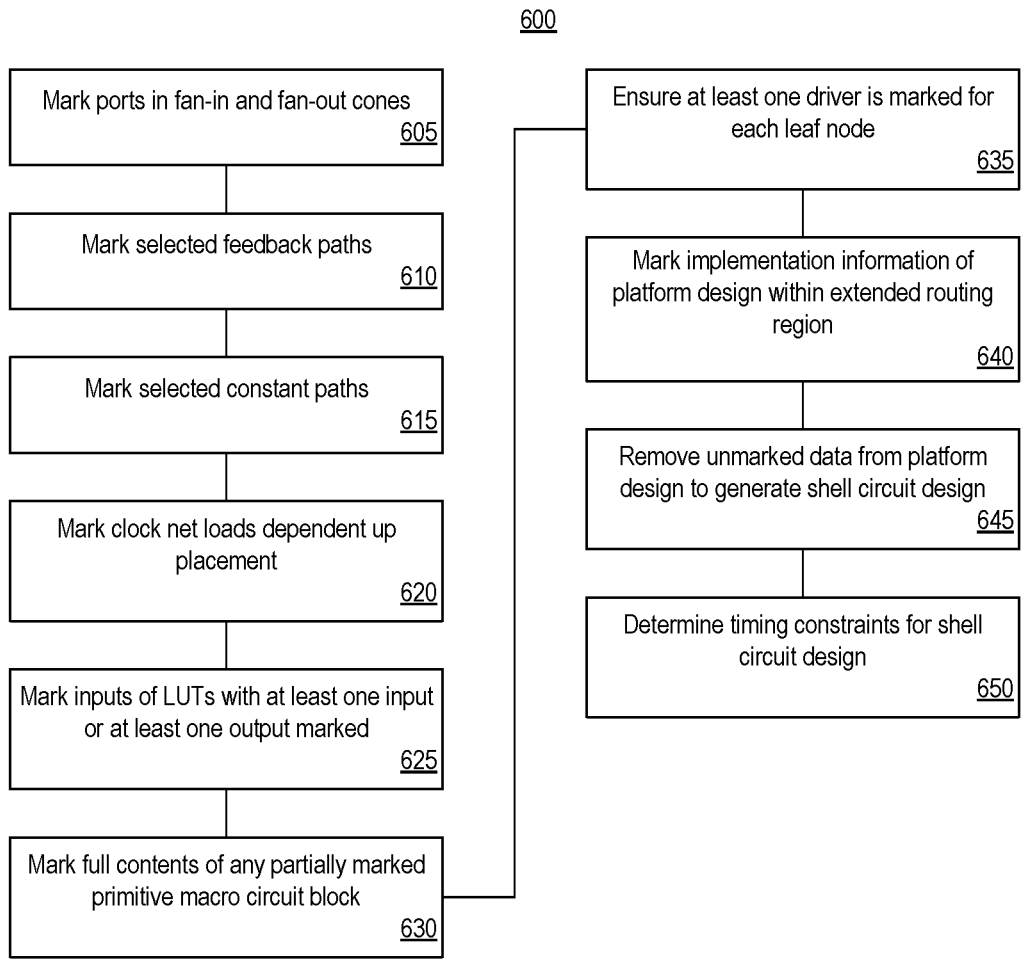
FIG. 6 illustrates an example method of creating a shell circuit design.

FIG. 6 illustrates an example method 600 of creating a shell circuit design. In particular embodiments, method 600 may be performed to implement block 525 of FIG. 5. As such, the system has loaded the platform design into runtime memory for purposes of generating a shell circuit design for a selected module black-box instance. In the example of FIG. 6, an explicit marking of timing constrained objects from the platform design is not performed. Rather than preserving each portion of the platform design that is referenced by any timing constraint, the example of FIG. 6 begins by keeping and preserving only the logic and/or circuitry from the platform boundary (synchronous boundary crossings as previously described) to first level synchronous elements, thus resulting in a significantly smaller footprint for the platform design for purposes of implementing the user design(s). Certain other circuit structures, for example, constant paths and lookup tables (LUTs), may also be preserved as part of the shell circuit design in accordance with the embodiments described below.

In addition, to address the use of extended routing regions, the system is capable of marking certain implementation data corresponding to the platform design. In one aspect, the system marks placement information and routing information for the platform design within the extended routing region. In another aspect, the system marks only the routing information for the platform design within the extended routing region. The marked data, which includes the implementation data for the platform design within the extended routing region is preserved as part of the shell circuit design.

In block 605, the system marks ports in the fan-in and fan-out cones of the platform design. The system processes the ports of the platform design that interface with the module black-box instance. In one or more embodiments, the system selects a partition pin from the selected module black-box instance. The system determines whether the partition pin is an input pin or an output pin of the module black-box instance. In the case of an output partition pin, the system traverses down a signal path from the selected partition pin forward into the platform design and continues until a first synchronous circuit element (e.g., a clocked circuit element) is reached in the platform design. An example of a synchronous circuit element is a flip-flop. Other examples of synchronous circuit elements include block RAMs, DSPs, or other circuit blocks that includes a flip-flop. The system marks the synchronous circuit element and any other logic encountered in the path from the output partition pin to the synchronous circuit element for preservation. For example, the system would also mark any LUTs encountered in the path between the output partition pin and the first encountered synchronous circuit element.

In the case of an input partition pin to the module black-box instance, the system traverses down a signal path from the selected partition pin backward into the platform design and continues until a first synchronous circuit element is reached. As discussed, examples of synchronous circuit elements include a flip-flop, a block RAM, a DSP, or other circuit block that includes a flip-flop. The system marks the synchronous circuit element and any other logic encountered in the path from the input partition pin to the first encountered synchronous circuit element for preservation. For example, the system would also mark any LUTs encountered in the path between the output partition pin and the synchronous circuit element.

The system repeats this process for each partition pin specified by the selected module black-box instance. By marking each of the synchronous circuit elements of the platform design encountered as described, the system is preserving the circuitry and/or logic of the platform design included in the synchronous boundary between the static region and the PR region. In this manner, the system identifies and preserves synchronous boundary crossings between the user design and the target platform. This allows the system to implement the user design. Further, preservation of the synchronous circuit elements provides synchronous boundary starting and/or stopping points for timing analysis when implementing the user design.

As discussed, in method 600, marking of all timing constrained objects of the platform design is not performed. Rather, only selected objects of the platform design are marked for preservation in the shell circuit design. In block 610, the system marks each feedback path of the platform design that involves a phase-locked loop (PLL) or a mixed-mode clock manager (MMCM) circuit block.

In block 615, the system marks constant paths of the platform design. The system is capable of marking constants of the platform design that propagate to any cell that is already marked (at that time), whether marked through fan-in cone marking, fanout cone marking, etc. The system queues the constant and marks the fan-in cone of the constant for preservation. For example, the system marks each constant path of the platform design that propagates or feeds into another marked area, object, or topology of the platform design. The system is also capable of marking any constant paths that feed into the module black-box instance.

In some cases, timing analysis may be sensitive to values of constants present and/or propagated in a circuit. For example, if a logic AND gate has a first input port driven by a constant logic 0, the output of the AND gate will be a constant logic 0 regardless of the signal propagated to a second input port of the AND gate. In that case, the system preserves the path with the constant logic 0 to ensure that a logic 0 is still propagated. Further, in the described case, the timing of the AND gate may be ignored. If a logic AND gate has a first input port driven by a constant logic 1, the output of the AND gate will change based upon the value of the signal provided to the other input of the AND gate. In the latter case, the system preserves the path with the unknown signal value since that signal determines timing for the AND gate. Accordingly, circuits that provide the constant must be preserved as described to retain equivalent timing in the shell circuit design.

In block 615, for example, the system is capable of determining ports of the platform design that connect to the selected module black-box instance and that correspond to a constant. Such ports may include, for example, ports driven directly by vcc/gnd, driven by constant outputs of upstream cells (e.g., a constant LUT output), or designated as a constant in the platform design (e.g., set_case_analysis sdc constraint, etc.). The system, for example, is capable of inspecting the module black-box instance to determine whether each port is a constant. After identifying a constant port, the system is capable of performing a backward breadth first search to mark ports in the fan-in cone of the constant port.

In another example, consider the case of a flip-flop connected to logic, connected to a multiplexer, connected to further logic, connected to a port of the module black-box instance. In this example, the select signal provided to the multiplexer may be controlled by a constant (e.g., constant logic or through a set_case_analysis sdc constraint). In that case, the system preserves the topology of the select signal to ensure that the correct (e.g., active) path through the multiplexer is available for timing analysis.

The examples described in connection with block 615 are provided for purposes of illustration. It should be appreciated that other scenarios result in the system marking portions of the topology of the platform design with constants propagating into marked objects and/or constants propagating into the module black-box instance.

In block 620, the system marks any clock net loads of the platform design that are dependent on placement for preservation of their delay characteristics. In block 625, the system marks all inputs of any LUTs of the platform design that have at least one input or at least one output marked. Thus, for any LUT that has at least one input or at least one output marked, the system marks each other input of the LUT. Marking performed in block 625 avoids complications arising from the different timing paths through the LUT. Preserving the entire LUT ensures that the same timing paths are preserved in the shell circuit design. Further, by evaluating whether input and outputs of LUTs are marked, the system is able to preserve single input LUTs where only the output of the LUT was marked. Otherwise, a single input LUT with only the output marked would propagate a constant 0, which may differ from what the circuit element would propagate had the input also been preserved.

In block 630, the system marks full contents of any partially marked primitive macro circuit block of the platform design. Block 630 ensures that the resulting shell circuit design includes complete versions of primitive macro circuit blocks rather than including only a portion of a primitive macro circuit block. Examples of primitive macro circuit blocks include, but are not limited to, digital signal processing (DSP) blocks, block RAMs, and different types of LUTs. Block 630 ensures that primitive macro circuit blocks are not decomposed so that a portion of such circuit block is removed from the shell circuit design while another portion of the circuit block remains within the shell circuit design. Block 630 also ensures that timing arcs through such circuit blocks are preserved in the resulting shell circuit design.

In block 635, the system ensures at least one leaf driver is marked for each leaf load of the platform design. For example, the system detects each leaf load of the platform design. The system checks whether at least one leaf driver is marked for each identified leaf load. In response to determining that a given leaf load does not have at least one driver marked, the system marks at least one of the leaf drivers of the leaf load. Block 635 ensures that there are no dangling, e.g., unconnected, leaf loads, left in the platform design.

In block 640, the system is capable of marking implementation data of the platform design that exists, or is within, the extended routing region. In some cases, the extended routing region extends only partially into the platform region. In other cases, the extended routing region is the same size as or is larger than the platform region.

In one aspect, the system marks both the placement and the routing information for the platform design that is within the extended routing region. Marking the placement and routing information for the platform design within the extended routing region ensures that such information is preserved. When a configuration bitstream (e.g., partial configuration bitstream) is generated for the user design, the configuration bitstream will include the placement and routing information for the portion of the platform design within the extended routing region, placement information for the user design, and routing information for the user design including those routes that extend into the extended routing region. For example, the configuration bitstream includes configuration data necessary for fully programming the columns of routing blocks and the columns of placement blocks of the user PR region and the extended routing region. As such, the configuration bitstream provides complete implementation data for the extended routing region.

In another aspect, the system marks only the routing information for the platform design that is within the extended routing region. Marking the routing information for the platform design within the extended routing region ensures that such data is preserved. When a configuration bitstream (e.g., partial configuration bitstream) is generated for the user design, the configuration bitstream will include routing information for the portion of the platform design within the extended routing region, placement information for the user design, and routing information for the user design including those routes that extend into the extended routing region. For example, the configuration bitstream includes configuration data necessary for fully programming the columns of routing blocks of the extended routing region and for fully programming the routing blocks and the placement blocks of the user PR region. This ensures that the complete implementation data for the extended routing region is loaded into the programmable IC.

In block 645, the system removes any unmarked objects of the platform design to generate the shell circuit design. In block 650, the system is capable of determining which of the timing constraints of the platform design relate to objects that are still included in the resulting shell circuit design. For example, the system is capable of identifying any timing constraints of the platform design that relate or correspond to marked objects and/or marked implementation data. The system is capable of storing a list of these timing constraints in association with the shell circuit design. This allows the system to recall the relevant timing constraints for the shell circuit design at a future time. Appreciably, the timing constraints for the shell circuit design is a subset of the timing constraints for the platform design.

Figure 7:
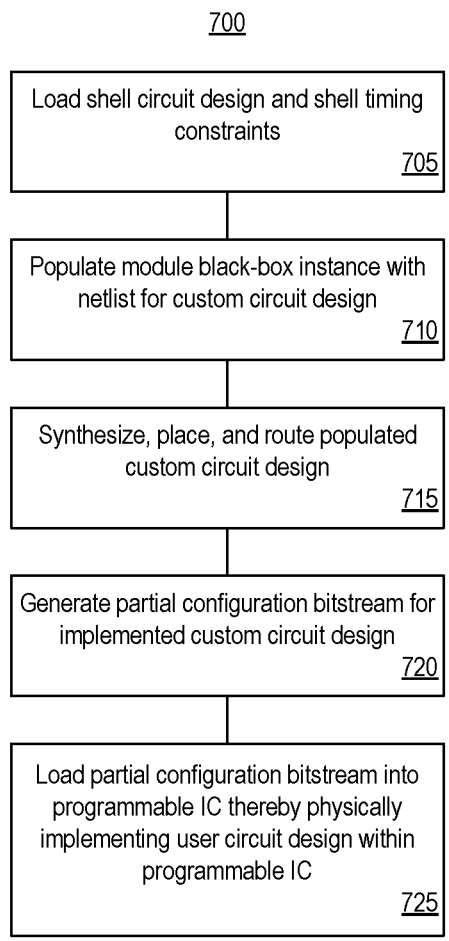
FIG. 7 illustrates another example method of implementing a user design using a shell circuit design.

FIG. 7 illustrates an example method 700 of implementing a user design using a shell circuit design. In particular embodiments, method 700 may be performed to implement block 540 of FIG. 5. Method 700 illustrates the implementation of a single user design. It should be appreciated that method 700 may be iterated as needed to implement further user (e.g., custom) designs for use with the platform design.

In block 705, the system loads a shell circuit design and the timing constraints for the shell circuit design (referred to herein as the "shell timing constraints") into runtime memory. In block 710, the system populates the module black-box instance of the shell circuit design with the netlist of the user design that is to be implemented. For example, the system loads the netlist of the user design into the module black-box instance associated with the user design.

In block 715, the system is capable of synthesizing, placing, and routing the user design. The system performs the design flow operations using the shell circuit design and the shell timing constraints. This ensures that the user design correctly integrates with the platform design and that boundary crossings meet established timing constraints. In block 720, the system is capable of generating a partial configuration bitstream for the implemented user design.

In block 725, the system (or another system such as a host system in a computing environment that uses hardware acceleration) is capable of physically implementing the implemented user design within the programmable IC. For example, the system is capable of causing the partial configuration bitstream generated in block 720 to be loaded into the programmable IC thereby physically implementing the circuitry of the user design in the PR region of the programmable IC. In block 725, it should be appreciated that a partial configuration bitstream (or a full configuration bitstream) specifying the platform design is already loaded into the programmable IC.

In one aspect, the partial configuration bitstream generated in block 720 includes placement and routing information for the user design in the user PR region, routing information for the user design for the extended routing region, and placement and routing information for the platform design in the extended routing region. In another aspect, the partial configuration bitstream generated in block 720 includes placement and routing information for the user design in the user PR region, routing information for the user design for the extended routing region, and routing information for the platform design in the extended routing region (e.g., no placement information for the platform design in the extended routing region).

The example implementations described within this disclosure allow a user design to be implemented using the shell circuit design where the resulting implementation of the user design has timing consistency, e.g., the same timing characteristics, as if the user design had been implemented using the full platform design. The timing consistency is guaranteed if the shell circuit design is generated and used as described herein.

Figure 8:
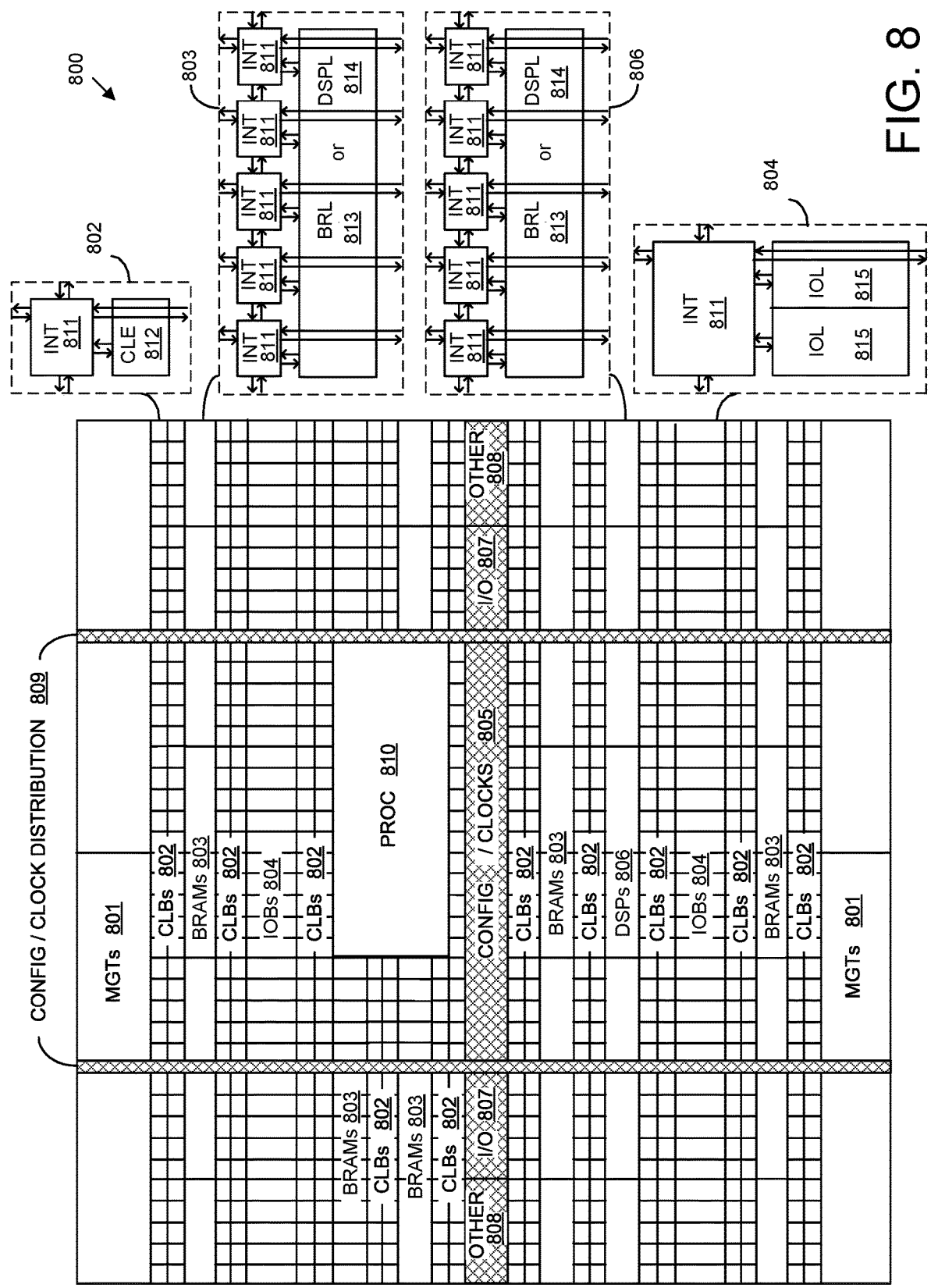
FIG. 8 illustrates an example architecture for a programmable IC.

FIG. 8 illustrates an example architecture 800 for an IC. In one aspect, architecture 800 may be implemented within a programmable IC. For example, architecture 800 may be used to implement a field programmable gate array (FPGA). Architecture 800 may also be representative of a system-on-chip (SoC) type of IC. An SoC is an IC that includes a processor that executes program code and one or more other circuits. The other circuits may be implemented as hard-wired circuitry, programmable circuitry, and/or a combination thereof. The circuits may operate cooperatively with one another and/or with the processor.

As shown, architecture 800 includes several different types of programmable circuit, e.g., logic, blocks. For example, architecture 800 may include a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized I/O blocks 807 (e.g., configuration ports and clock ports), and other programmable logic 808 such as digital clock managers, analog-to-digital converters, system monitoring logic, and so forth.

In some ICs, each programmable tile includes a programmable interconnect element (INT) 811 having standardized connections to and from a corresponding INT 811 in each adjacent tile. Therefore, INTs 811, taken together, implement the programmable interconnect structure for the illustrated IC. Each INT 811 also includes the connections to and from the programmable logic element within the same tile, as shown by the examples included at the top of FIG. 8.

For example, a CLB 802 may include a configurable logic element (CLE) 812 that may be programmed to implement user logic plus a single INT 811. A BRAM 803 may include a BRAM logic element (BRL) 813 in addition to one or more INTs 811. Typically, the number of INTs 811 included in a tile depends on the height of the tile. As pictured, a BRAM tile has the same height as five CLBs, but other numbers (e.g., four) also may be used. A DSP tile 806 may include a DSP logic element (DSPL) 814 in addition to an appropriate number of INTs 811. An 10B 804 may include, for example, two instances of an I/O logic element (IOL) 815 in addition to one instance of an INT 811. The actual I/O pads connected to IOL 815 may not be confined to the area of IOL 815.

In the example pictured in FIG. 8, a horizontal area near the center of the die, e.g., formed of regions 805, 807, and 808, may be used for configuration, clock, and other control logic. Vertical areas 809 extending from this horizontal area may be used to distribute the clocks and configuration signals across the breadth of the programmable IC.

Some ICs utilizing the architecture illustrated in FIG. 8 include additional logic blocks that disrupt the regular columnar structure making up a large part of the IC. The additional logic blocks may be programmable blocks and/or dedicated circuitry. For example, a processor block depicted as PROC 810 spans several columns of CLBs and BRAMs.

In one aspect, PROC 810 may be implemented as dedicated circuitry, e.g., as a hardwired processor, that is fabricated as part of the die that implements the programmable circuitry of the IC. PROC 810 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 810 may be omitted from architecture 800 and replaced with one or more of the other varieties of the programmable blocks described. Further, such blocks may be utilized to form a "soft processor" in that the various blocks of programmable circuitry may be used to form a processor that can execute program code as is the case with PROC 810.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 8 that are external to PROC 810 such as CLBs 802 and BRAMs 803 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 810. Other examples of hardened circuit blocks include direct memory access circuit blocks, bus endpoints, and memory controllers (not shown) which may also be included within architecture 800.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 810 or a soft processor. In some cases, architecture 800 includes a dedicated configuration processor that loads the configuration bitstream to the appropriate configuration memory and/or processor memory. The dedicated configuration processor does not execute user-specified program code. In other cases, architecture 800 may utilize PROC 810 to receive the configuration bitstream, load the configuration bitstream into appropriate configuration memory, and/or extract program code for execution.

FIG. 8 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 8 are purely illustrative. In an actual IC, for example, more than one adjacent column of CLBs is typically included wherever the CLBs appear, to facilitate the efficient implementation of a user design. The number of adjacent CLB columns, however, may vary with the overall size of the IC. Further, the size and/or positioning of blocks such as PROC 810 within the IC are for purposes of illustration only and are not intended as limitations. Further, for purposes of illustration, the example of FIG. 8 illustrates the placement and routing blocks as simply blocks. It should be appreciated that the blocks illustrated in FIG. 8 may be formed of a placement block and a routing block to form columns of placement and routing blocks as illustrated in FIG. 4.

The inventive arrangements described herein result in significantly reduced runtimes, reduced peak memory usage, and reduced amount of logic/circuitry of the platform design that needs to be considered when a computing system implements a user design. For example, the amount of logic/circuitry of the platform design that may be removed to generate the shell circuit design is, in some cases, as high as approximately 90%. This reduction leads to a runtime reduction of the computing system of approximately 40% and a reduction of peak memory usage of approximately 25%. These results provide computing performance improvements over techniques that do not use a shell circuit design as well as techniques that, while using a shell circuit design, generate the shell circuit design by keeping timing constrained circuitry that may not be relevant to the portion of the platform circuit design that connects to the user design.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, a method can include loading, using computer hardware, a platform design including a module black-box instance corresponding to a user design. The method can include marking, using the computer hardware, data of the platform design including data relating to synchronous boundary crossings between the platform design and the module black-box instance and implementation data for the platform design within an extended routing region available for routing the user design. The method can also include removing, using the computer hardware, unmarked data from the platform design resulting in a shell circuit design. The method further can include implementing, using the computer hardware, the user design based on the shell circuit design and timing constraints corresponding to marked data in the shell circuit design.

The implementation data may include placement information and routing information for the platform design within the extended routing region. In another aspect, the implementation data may include routing information for the platform design within the extended routing region (e.g., only routing information and no placement information for the platform design).

In one aspect, the marking includes marking constant paths of the shell circuit design that propagate into a marked circuit element of the platform design.

In another aspect, the marking includes marking feedback loops that include phase-lock loop circuit blocks of the platform design.

In another aspect, the marking includes marking feedback loops that include mixed model clock manager circuit blocks of the platform design.

In another aspect, the marking includes marking clock net loads of the shell circuit design that are dependent on placement for delay preservation.

In another aspect, the marking includes marking full contents of each primitive macro of the platform design that include at least one marked circuit element.

In another aspect, the marking includes determining each marked circuit element that is a leaf load, determining each driver of each marked circuit element that is a leaf load, and, for each marked circuit element that is a leaf load, in response to determining that no driver of the marked circuit element that is a leaf load is marked, marking a driver of the marked circuit element that is a leaf load.

In another aspect, the marking includes marking each input of a lookup table that has at least one input or at least one output marked.

In another aspect, the implementing includes determining the timing constraints of the platform design that are associated with objects in the shell circuit design.

In another aspect, the implementing includes synthesizing, placing, and routing the user design.

Another aspect includes a system having a processor configured to initiate operations. The operations can include loading a platform design including a module black-box instance corresponding to a user design. The operations can include marking data of the platform design including data relating to synchronous boundary crossings between the platform design and the module black-box instance and implementation data for the platform design within an extended routing region available for routing the user design. The operations can also include removing unmarked data from the platform design resulting in a shell circuit design. The operations further can include implementing the user design based on the shell circuit design and timing constraints corresponding to marked data in the shell circuit design.

The implementation data may include placement information and routing information for the platform design within the extended routing region. In another aspect, the implementation data may include routing information for the platform design within the extended routing region (e.g., only routing information and no placement information for the platform design).

In one aspect, the marking includes marking constant paths of the shell circuit design that propagate into a marked circuit element of the platform design.

In another aspect, the marking includes marking feedback loops that include phase-lock loop circuit blocks of the platform design.

In another aspect, the marking includes marking feedback loops that include mixed model clock manager circuit blocks of the platform design.

In another aspect, the marking includes marking clock net loads of the shell circuit design that are dependent on placement for delay preservation.

In another aspect, the marking includes marking full contents of each primitive macro of the platform design that include at least one marked circuit element.

In another aspect, the marking includes determining each marked circuit element that is a leaf load, determining each driver of each marked circuit element that is a leaf load, for each marked circuit element that is a leaf load, in response to determining that no driver of the marked circuit element that is a leaf load is marked, marking a driver of the marked circuit element that is a leaf load.

In another aspect, the marking includes marking each input of a lookup table that has at least one input or at least one output marked.

In another aspect, the implementing includes determining the timing constraints of the platform design that are associated with objects in the shell circuit design.

In another aspect, the implementing includes synthesizing, placing, and routing the user design.

Another aspect includes a computer program product including a computer readable storage medium having program code stored thereon. The program code is executable by computer hardware to initiate operations. The operations can include loading a platform design including a module black-box instance corresponding to a user design. The operations can include marking data of the platform design including data relating to synchronous boundary crossings between the platform design and the module black-box instance and implementation data for the platform design within an extended routing region available for routing the user design. The operations can also include removing unmarked data from the platform design resulting in a shell circuit design. The operations further can include implementing the user design based on the shell circuit design and timing constraints corresponding to marked data in the shell circuit design.

The implementation data may include placement information and routing information for the platform design within the extended routing region. In another aspect, the implementation data may include routing information for the platform design within the extended routing region (e.g., only routing information and no placement information for the platform design).

In one aspect, the marking includes marking constant paths of the shell circuit design that propagate into a marked circuit element of the platform design.

In another aspect, the marking includes marking feedback loops that include phase-lock loop circuit blocks of the platform design.

In another aspect, the marking includes marking feedback loops that include mixed model clock manager circuit blocks of the platform design.

In another aspect, the marking includes marking clock net loads of the shell circuit design that are dependent on placement for delay preservation.

In another aspect, the marking includes marking full contents of each primitive macro of the platform design that include at least one marked circuit element.

In another aspect, the marking includes determining each marked circuit element that is a leaf load, determining each driver of each marked circuit element that is a leaf load, for each marked circuit element that is a leaf load, in response to determining that no driver of the marked circuit element that is a leaf load is marked, marking a driver of the marked circuit element that is a leaf load.

In another aspect, the marking includes marking each input of a lookup table that has at least one input or at least one output marked.

In another aspect, the implementing includes determining the timing constraints of the platform design that are associated with objects in the shell circuit design.

In another aspect, the implementing includes synthesizing, placing, and routing the user design.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    loading, using computer hardware, a platform design including a module black-box instance corresponding to a user design, wherein the platform design is a circuit design that is placed and routed and the module black-box instance is empty;
    marking, using the computer hardware, data of the platform design including data relating to synchronous boundary crossings between the platform design and the module black-box instance and implementation data for the platform design for an extended routing region;
    wherein the synchronous boundary crossings include a partition pin of the module black-box instance, a first synchronous circuit element along on a signal path from the partition pin into the platform design, and logic between the partition pin and the first synchronous circuit element;
    wherein the extended routing region corresponds to a region of programmable circuitry of an integrated circuit that includes at least a portion of the platform design and routing for one or more signals of the user design;
    removing, using the computer hardware, unmarked data from the platform design resulting in a shell circuit design; and
    implementing, using the computer hardware, the user design based on the shell circuit design and timing constraints corresponding to marked data in the shell circuit design, wherein the user design includes the implementation data for the platform design for the extended routing region.

2. The method of claim 1, wherein the implementation data includes placement information and routing information for the platform design within the extended routing region.

3. The method of claim 1, wherein the implementation data includes routing information for the platform design within the extended routing region.

4. The method of claim 1, wherein the marking further comprises:
    marking constant paths of the shell circuit design that propagate into a marked circuit element of the platform design.

5. The method of claim 1, wherein the marking further comprises:
    marking feedback loops that include phase-lock loop circuit blocks of the platform design or mixed model clock manager circuit blocks of the platform design.

6. The method of claim 1, wherein the marking further comprises:
    marking clock net loads of the shell circuit design that are dependent on placement for delay preservation.

7. The method of claim 1, wherein the marking further comprises:
    marking full contents of each primitive macro of the platform design that include at least one marked circuit element.

8. The method of claim 1, wherein the marking further comprises:
    determining each marked circuit element that is a leaf load;
    determining each driver of each marked circuit element that is a leaf load; and
    for each marked circuit element that is a leaf load, in response to determining that no driver of the marked circuit element that is a leaf load is marked, marking a driver of the marked circuit element that is a leaf load.

9. The method of claim 1, wherein the marking further comprises:
    marking each input of a lookup table that has at least one input or at least one output marked.

10. The method of claim 1, wherein the implementing comprises:
    determining the timing constraints of the platform design that are associated with objects in the shell circuit design.

11. A system, comprising:
    a processor configured to initiate operations comprising:
    loading a platform design including a module black-box instance corresponding to a user design, wherein the platform design is a circuit design that is placed and routed and the module black-box instance is empty;
    marking data of the platform design including data relating to synchronous boundary crossings between the platform design and the module black-box instance and implementation data for the platform design for an extended routing region;
    wherein the synchronous boundary crossings include a partition pin of the module black-box instance, a first synchronous circuit element along on a signal path from the partition pin into the platform design, and logic between the partition pin and the first synchronous circuit element;
    wherein the extended routing region corresponds to a region of programmable circuitry of an integrated circuit that includes at least a portion of the platform design and routing for one or more signals of the user design;
    removing unmarked data from the platform design resulting in a shell circuit design; and
    implementing the user design based on the shell circuit design and timing constraints corresponding to marked data in the shell circuit design, wherein the user design includes the implementation data for the platform design for the extended routing region.

12. The system of claim 11, wherein the implementation data includes placement information and routing information for the platform design within the extended routing region.

13. The system of claim 11, wherein the implementation data includes routing information for the platform design within the extended routing region.

14. The system of claim 11, wherein the marking further comprises:
    marking constant paths of the shell circuit design that propagate into a marked circuit element of the platform design.

15. The system of claim 11, wherein the marking further comprises:
    marking feedback loops that include phase-lock loop circuit blocks of the platform design or mixed model clock manager circuit blocks of the platform design.

16. The system of claim 11, wherein the marking further comprises:
    marking clock net loads of the shell circuit design that are dependent on placement for delay preservation.

17. The system of claim 11, wherein the marking further comprises:
    marking full contents of each primitive macro of the platform design that include at least one marked circuit element; and
    marking each input of a lookup table that has at least one input or at least one output marked.

18. The system of claim 11, wherein the marking further comprises:
    determining each marked circuit element that is a leaf load;
    determining each driver of each marked circuit element that is a leaf load; and
    for each marked circuit element that is a leaf load, in response to determining that no driver of the marked circuit element that is a leaf load is marked, marking a driver of the marked circuit element that is a leaf load.

19. The system of claim 11, wherein the implementing comprises:
    determining the timing constraints of the platform design that are associated with objects in the shell circuit design.

20. A computer program product, comprising:
    a computer readable storage medium having program code stored thereon, wherein the program code is executable by computer hardware to initiate operations including:
    loading a platform design including a module black-box instance corresponding to a user design, wherein the platform design is a circuit design that is placed and routed and the module black-box instance is empty;
    marking data of the platform design including data relating to synchronous boundary crossings between the platform design and the module black-box instance and implementation data for the platform design for an extended routing region;

wherein the synchronous boundary crossings include a partition pin of the module black-box instance, a first synchronous circuit element along on a signal path from the partition pin into the platform design, and logic between the partition pin and the first synchronous circuit element;

wherein the extended routing region corresponds to a region of programmable circuitry of an integrated circuit that includes at least a portion of the platform design and routing for one or more signals of the user design;

removing unmarked data from the platform design resulting in a shell circuit design; and implementing the user design based on the shell circuit design and timing constraints corresponding to marked data in the shell circuit design, wherein the user design includes the implementation data for the platform design for the extended routing region.

* * * * *